United States Patent
Gamage et al.

(10) Patent No.: US 10,382,352 B2
(45) Date of Patent: Aug. 13, 2019

(54) DISTRIBUTED RESOURCE SCHEDULING BASED ON NETWORK UTILIZATION

(71) Applicant: VMware, Inc., Palo Alto, CA (US)

(72) Inventors: Sahan B. Gamage, West Lafayette, IN (US); Rean Griffith, Oakland, CA (US)

(73) Assignee: VMware Inc., Palo Alto, CA (US)

( * ) Notice: Subject to any disclaimer, the term of this patent is extended or adjusted under 35 U.S.C. 154(b) by 237 days.

(21) Appl. No.: 15/352,033

(22) Filed: Nov. 15, 2016

(65) Prior Publication Data
US 2018/0139148 A1    May 17, 2018

(51) Int. Cl.
| | |
|---|---|
| G06F 15/173 | (2006.01) |
| H04L 12/911 | (2013.01) |
| H04L 12/26 | (2006.01) |
| G06F 9/445 | (2018.01) |
| H04L 12/24 | (2006.01) |
| G06F 9/455 | (2018.01) |
| G06F 9/50 | (2006.01) |

(52) U.S. Cl.
CPC ............ *H04L 47/70* (2013.01); *G06F 9/445* (2013.01); *G06F 9/45558* (2013.01); *G06F 9/50* (2013.01); *H04L 41/00* (2013.01); *H04L 43/0876* (2013.01); *G06F 2009/4557* (2013.01); *G06F 2009/45562* (2013.01); *G06F 2009/45595* (2013.01)

(58) Field of Classification Search
CPC ...... H04L 43/0876; H04L 47/70; H04L 67/10
See application file for complete search history.

(56) References Cited

U.S. PATENT DOCUMENTS

| | | | | |
|---|---|---|---|---|
| 8,260,728 | B1 * | 9/2012 | Walsh | A63F 13/5375 |
| | | | | 706/12 |
| 8,321,515 | B1 * | 11/2012 | Gailloux | H04L 51/34 |
| | | | | 709/206 |
| 9,015,708 | B2 * | 4/2015 | Choudhury | G06F 9/45558 |
| | | | | 709/223 |
| 9,516,053 | B1 * | 12/2016 | Muddu | H04L 63/1425 |
| 9,563,453 | B2 * | 2/2017 | Gulati | G06F 9/5088 |
| 9,563,463 | B2 * | 2/2017 | Innan | G06F 9/5088 |
| 10,055,257 | B2 * | 8/2018 | Birkestrand | G06F 9/4856 |
| 2009/0210527 | A1 * | 8/2009 | Kawato | G06F 9/45558 |
| | | | | 709/224 |
| 2011/0131571 | A1 * | 6/2011 | Heim | G06F 9/45558 |
| | | | | 718/1 |
| 2012/0036515 | A1 * | 2/2012 | Heim | G06F 9/5088 |
| | | | | 718/105 |

(Continued)

OTHER PUBLICATIONS

Billaud et al., "hClock: Hierarchical QoS for Packet Scheduling in a Hypervisor", Eurosys'13 Apr. 15-17, 2013, 14 pages.

(Continued)

*Primary Examiner* — Shean Tokuta
(74) *Attorney, Agent, or Firm* — Thomas | Horstemeyer, LLP

(57) ABSTRACT

Examples provide a network-utilization based scheduler that considers network utilization when load balancing virtual computing instances (VCIs) in a cluster. The scheduler also periodically evaluates proposed migrations based on a current cluster snapshot including network utilization data of the hosts. Proposed migrations are removed and/or prioritized to prevent network saturation in the cluster.

20 Claims, 12 Drawing Sheets

(56) References Cited

U.S. PATENT DOCUMENTS

| | | | | |
|---|---|---|---|---|
| 2012/0137001 A1* | 5/2012 | Ferris | | H04L 67/16 |
| | | | | 709/226 |
| 2012/0137003 A1* | 5/2012 | Ferris | | H04L 67/16 |
| | | | | 709/226 |
| 2014/0165063 A1* | 6/2014 | Shiva | | G06F 9/45533 |
| | | | | 718/1 |
| 2014/0282520 A1* | 9/2014 | Sabharwal | | G06F 9/455 |
| | | | | 718/1 |
| 2015/0058400 A1* | 2/2015 | Parikh | | H04L 67/1002 |
| | | | | 709/203 |
| 2015/0347183 A1* | 12/2015 | Borthakur | | G06F 9/4856 |
| | | | | 718/105 |
| 2015/0358205 A1* | 12/2015 | Brophy | | G06F 9/45558 |
| | | | | 709/224 |
| 2016/0112510 A1* | 4/2016 | Bai | | H04L 67/1095 |
| | | | | 709/217 |
| 2016/0179560 A1* | 6/2016 | Ganguli | | G06F 9/45558 |
| | | | | 718/1 |
| 2016/0366041 A1* | 12/2016 | Seenappa | | H04L 43/12 |
| 2016/0380906 A1* | 12/2016 | Hodique | | H04L 47/70 |
| | | | | 709/226 |
| 2017/0060611 A1* | 3/2017 | Birkestrand | | G06F 9/4856 |
| 2017/0063622 A1* | 3/2017 | Yoshida | | H04L 41/0836 |
| 2018/0063025 A1* | 3/2018 | Nambiar | | H04L 47/82 |
| 2018/0131568 A1* | 5/2018 | Manickam | | H04L 41/0893 |

OTHER PUBLICATIONS

Grandl et al., "Multi-Resource Packing for Cluster Schedulers", SIGCOMM'14, Aug. 17-22, 2014, 12 pages.

Gulati et al., "VMware Distributed Resource Management: Design, Implementation, and Lessons Learned", VMware Distributed Resource Management: Design, Implementation and Lessons Learned, The VMware Technical Journal (VMTJ), 2012, 20 pages.

* cited by examiner

FIG. 10

|  | VM1 | VM2 | VMi |
|---|---|---|---|
| CPU | 1100 | 1200 | 500 |
| Mem | 512 | 512 | 512 |
| Net | 700 | 0 | 300 |
| Placed Host (DRS) | H1 | H2 | *H1* |
| Placed Host (NetAwareDRS) | H1 | H2 | *H2* |

|  | VM1 | VM2 | VMi |
|---|---|---|---|
| CPU | 500 | 500 | 500 |
| Mem | 1100 | 1200 | 512 |
| Net | 700 | 0 | 300 |
| Placed Host (DRS) | H1 | H2 | *H1* |
| Placed Host (NetAwareDRS) | H1 | H2 | *H2* |

|  | VM1 | VM2 | VM3 | VMi |
|---|---|---|---|---|
| CPU | 600 | 1000 | 500 | 500 |
| Mem | 512 | 512 | 512 | 512 |
| Net | 400 | 400 | 700 | 300 |
| Placed Host (DRS) | H1 | H2 | H1 | *H3* |
| Placed Host (NetAwareDRS) | H1 | H2 | H2 | *H1* |

|  | VM1 | VM2 | VM3 |
|---|---|---|---|
| CPU | 3500 | 1000 | 800 |
| Mem | 512 | 512 | 512 |
| Net | 100 | 100 | 800 |
| Host before load balancing | H1 | H1 | H2 |
| Host after load balancing (DRS) | H1 | *H2* | H2 |
| Host after load balancing (NetAwareDRS) | H1 | *H1* | H2 |

|  | VM1 | VM2 | VM3 | VM4 |
|---|---|---|---|---|
| CPU | 1400 | 1400 | 1200 | 1100 |
| Mem | 512 | 512 | 512 | 512 |
| Net | 100 | 100 | 0 | 800 |
| Host before load balancing | H1 | H1 | H2 | H3 |
| Host after load balancing (DRS) | H1 | *H3* | H2 | H3 |
| Host after load balancing (NetAwareDRS) | H1 | *H2* | H2 | H3 |

1400

US 10,382,352 B2

DISTRIBUTED RESOURCE SCHEDULING BASED ON NETWORK UTILIZATION

BACKGROUND

A scheduler is utilized, in some existing systems, to select a host for initial placement of powering-on virtual machines (VMs) and manage migrations of VMs to balance resource utilization among the hosts in the cluster. However, these placement and relocation decisions are frequently made based on insufficient information regarding resource demands of the VMs and resource availability of the hosts. For example, most VMs deployed in a cluster of hosts have networking resource requirements. The VMs communicate with other VMs on the same host and/or VMs on different hosts. Currently available schedulers typically only consider processor and memory resources within the cluster when performing scheduling. These schedulers do not consider the VMs' or the hosts' networking behavior when performing placement or load-balancing. This lack of consideration of network resource metrics frequently causes non-optimal VM initial placements and VM migrations, network saturated hosts, overloaded network links, and other network resource contention at the hosts.

For example, some existing schedulers may perform an admission control check to ensure that the sum of network reservations on a VM's outbound (transmit) bandwidth on a host do not exceed its capacity. However, actual usage of a host's network interface controllers (NICs) is not considered with these existing schedulers.

Further, elastic resource provisioning in a software defined datacenter (SDDC) is frequently managed by a number of different schedulers managing different resources independently of one another. For example, some systems computer resources, such as CPU and memory, are managed by a resource scheduler, storage resources are managed by a storage scheduler, and network resources are managed by a separate network scheduler. These different schedulers operate independently from each other and frequently work on different sets of input metrics. The utilization of these disparate schedulers also results in sub-optimal VM placements and inefficient resource management in the datacenter.

SUMMARY

Examples of the disclosure provide for distributed resource scheduling based on network utilization. A statistics channel provides runtime statistics associated with a cluster of hosts to a scheduler. An initial placement component of the scheduler ranks each host in the candidate set of hosts based on network utilization. A host is selected for placement of a powering-on virtual computing instance (VCI) based on the ranking. The powering-on VCI is placed on the selected host to minimize network saturation of hosts. A load balancing component generates a score for at least one proposed migration in a set of proposed migrations based on network utilization associated with at least one destination host in the set of proposed migrations. A filter component of the scheduler rejects a given proposed migration in the set of proposed migrations in response to a determination that a given score associated with the given proposed migration indicates a destination host associated with the proposed migration is network saturated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 is an exemplary table illustrating results of a first initial placement experiment.

FIG. 11 is an exemplary table illustrating results of a second initial placement experiment.

FIG. 12 is an exemplary table illustrating results of a third initial placement experiment.

FIG. 13 is an exemplary table illustrating results of a first load balancing experiment.

FIG. 14 is an exemplary table illustrating results of a second load balancing experiment.

Corresponding reference characters indicate corresponding parts throughout the drawings.

DETAILED DESCRIPTION

Figure 1:
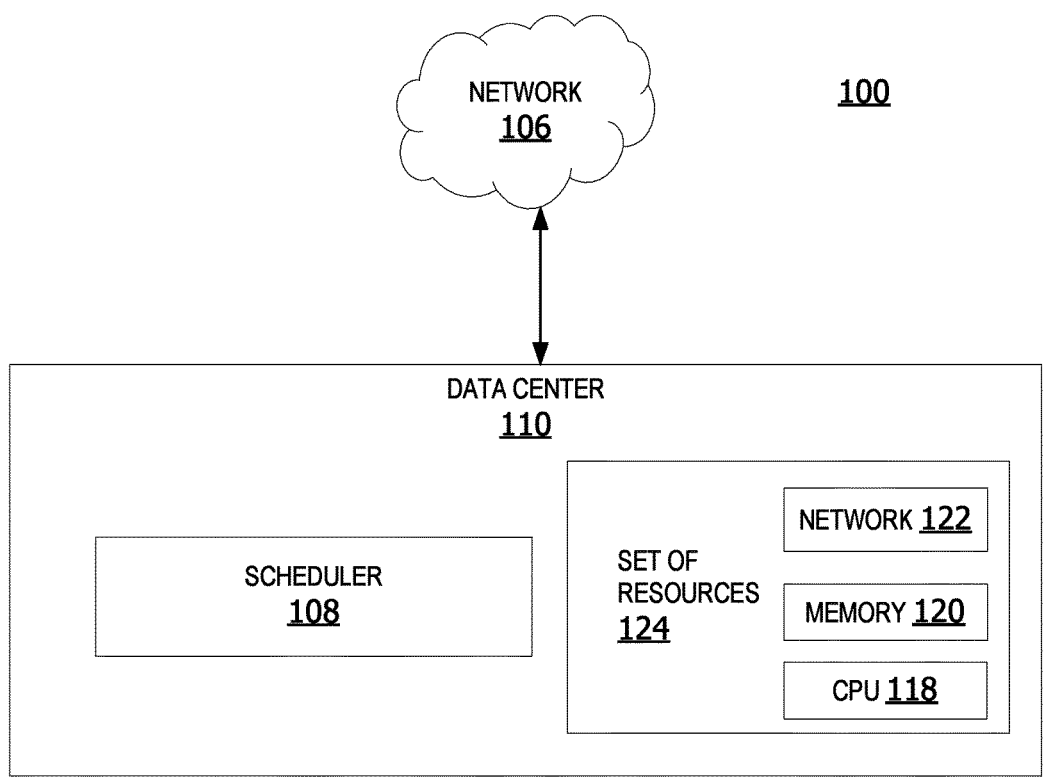
FIG. 1 is an exemplary block diagram illustrating a system for a network-utilization based scheduler.

Referring to the figures, examples of the disclosure include a network-utilization based scheduler for network-utilization based distributed resource scheduling in a cluster. Applications hosted in a virtualized data center such as data center 110 in FIG. 1 are frequently network intensive in nature. Many modern applications are distributed and work as a group to achieve the required enterprise level functionality and performance. For example, applications may include three tier web applications, replicated database systems, distributed key-value stores, etc. Each component of such distributed applications are packaged into a single container, virtual machine (VM), or other virtual computing instance (VCI) and deployed in a cluster of physical server machines, such as a set of servers.

Given that the VCIs host different components of such applications, each VCI has different resource requirements. In other words, the VCIs may have highly diverse requirements for a set of resources 124 including central processing unit (CPU) 118, memory 120, and network 122 resources.

The scheduler as described herein is a form of a distributed resource scheduler (DRS) that manages resources in a cluster, such as CPU, memory and/or storage as well as network. In some examples, the primary metric the scheduler optimizes is dynamic entitlement. This metric reflects resource delivery in accordance with both the needs and importance of the VMs and is a function of the VMs actual resource demands, overall cluster capacity, and the VMs resource settings. The VMs resource settings may include reservations, limits, and shares. A reservation is a claim or guarantee on a specific amount of a resource should the VM demand it. A VMs entitlement for a resource is higher than its reservation and lower than its limit. Dynamic entitlement is equal to VM demand if there are sufficient resources in the cluster to meet all VM demands. Otherwise, it is scaled down based on cluster capacity, the demands of other VMs, and its settings for reservations, shares, and limits.

The scheduler computes host load (its normalized entitlement) in some examples by summing up the entitlements of the VMs running in it and normalizing it using the hosts capacity. This normalized entitlement is then used to calculate the cluster balance metric, which is the standard deviation of the normalized entitlements of hosts. The primary target of the optimization algorithm is to move the standard deviation value close to zero when making placement decisions or load-balancing.

The scheduler 108 in the present disclosure manages compute, memory, and network resources together. The scheduler does not consider network resource usage independently from CPU usage, in some examples. Even with support for hardware offloading, processor cycles are needed to drive traffic. The positive correlation between compute and networking places networking as a secondary, dependent resource rather than a primary, independent resource in some of these examples. In other examples, the scheduler 108 further manages storage resources.

In some examples, the scheduler selects a host for placement of a VCI from a candidate set of server hosts based at least in part on network resource availability and/or network resource utilization of the hosts and VCI. The VCI may include a VM, a container, or any other type of VCI, as further described herein.

The network resource data of the host includes the network utilization of VCIs on the host, the host's network capacity, the network availability of the host, network requirements of the powering-on VCI or migrating VCI, and/or other network resource data. The powering-on VCI or a migrated VCI is placed on the selected host. Selecting a host from the candidate set of hosts based on network resource data reduces network saturation of hosts and reduces network bandwidth usage.

In some examples, the candidate set of hosts is selected based on a primary ranking of host processor resources and memory resources. A secondary ranking is performed on the candidate set of hosts based on processor resources, memory resources, and network resources (e.g., network resource data). The host in the candidate set with the best or highest ranking is selected for placement of the VCI. This enables cluster scheduling by optimizing memory and processor resources while also optimizing network resources.

In other examples, the scheduler evaluates proposed VCI migrations based on network resources (e.g., network resource data) of the proposed target hosts. This network-utilization based scheduling improves host selection speed, reduces processor load, conserves memory, avoids placement of VCIs that may increase network saturation, and remediates network saturated hosts.

In still other examples, proposed migrations are selected based on memory resources and processor resources of the hosts. The proposed migrations are then scored based on network resource utilization of the proposed target hosts. Proposed migrations are filtered or allowed based on the scores. The scheduler considers multiple resource metrics, including networking metrics, for placement of powering on VCIs and migrations. This enables more accurate and reliable selection of hosts to reduce processor load, prevent host network saturation, improve cluster resource utilization, and enable more efficient placement of virtual computing instances on hosts in a cluster.

In some examples, the scheduler considers processor resources and memory resource to optimize host selection at a primary resource level selection. The scheduler then considers networking resources at a secondary resource level host selection for a powering-on or migrating VCI. This enables the scheduler to provide an improved distribution of load, increase VCI packing density on hosts, and minimize VCI network contention.

In some examples, the scheduler considers host internal network traffic and host external network traffic during evaluations of proposed host placements and proposed host migrations. Host internal network traffic includes communications between VCIs on the same host. Host external network traffic is communications between VCIs on different hosts. The scheduler filters out proposed migration placements that would saturate the host's network interfaces with host external network traffic. This improves communication speed between VCIs, reduces network bandwidth usage, and improves network resource efficiency within the cluster.

The cluster is a collection of hosts in which system resources, such as processor and memory resources, are aggregated for utilization by hosts in the cluster. A host is a server or any other computing device capable of running one or more VCIs, such as a VM. A host may be implemented as a physical server, or as a cloud instance running within a cloud environment. A cloud instance of a host is a host running within a VM, a container, or other VCIs. This may be implemented as a first hypervisor running within a VM, which is running over a second hypervisor, in some examples. A cloud instance of a host runs within a VCI, while supporting one or more other computing instances. A VM running within a cloud instance of a host may be referred to as a nested VM.

While some embodiments are described with reference to VMs for clarity of description, the disclosure is operable with other forms of VCIs. A VCI may be a VM, a container, and/or any other type of virtualized computing instance.

Referring to FIG. 1, an exemplary block diagram illustrates a system for a network-utilization based scheduler. Cloud services are provided to clients via a network 106. The network 106, in some examples, is a Wide Area Network (WAN) accessible to the public, such as the Internet. The cloud services are provided via one or more physical servers, such as a set of servers associated with data center 110.

In this example, the data center 110 includes one or more physical computing devices in the set of servers and/or data storage device(s). The set of servers may include a single server, as well as two or more servers in a cluster. In some examples, the set of servers includes a rack scale architecture (RSA) housing a plurality of physical servers. In yet other examples, the set of servers includes one or more blade servers. In still other examples, the set of servers is implemented as a VMware vSphere cluster from VMware, Inc.

The set of servers supports any VCI. The VCI may be considered to be part of a cloud, which may be implemented as a private cloud, a public cloud, or a hybrid cloud. A hybrid cloud is a cloud that includes a public cloud and a private cloud. VMware's vCloud Hybrid Services (vCHS) is an example of a hybrid cloud implementation.

The VCI includes a VM, a container, and/or any other form of VCI. A VM typically includes an operating system (OS) running one or more applications or portions of an application to perform a workload. VMs running on a host utilize cluster resources to perform the workloads. The data center 110 in this non-limiting example hosts a set of one or more VMs running on one or more servers.

The data storage device(s) in this non-limiting example includes one or more devices for storing data. The data storage device(s) may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) may include rotational storage, such as a disk. The data storage device(s) may also include non-rotational storage media, such as SSD or flash memory.

In some non-limiting examples, the data storage device(s) provide a shared data store. The shared data store is a data storage accessible by two or more hosts in the cluster.

In some examples, the system 100 optionally includes a remote data storage device. The remote data storage is accessible to the data center 110 via the network 106.

The system 100 may optionally include one or more other remote computing devices. The remote computing device may be a client, a server, or any other type of computing device accessible via the network 106. The remote computing device may be associated with one or more users. For example, a user associated with the remote computing device may utilize the network 106 to send data to the data center 110 and receive data from the data center 110.

The scheduler 108 in this non-limiting example, is a network-utilization based distributed resource scheduler. The scheduler utilizes network resource data associated with one or more VCIs associated with the data center 110 to make decisions regarding initial placement of powering-on VCIs and migrations of VCIs for purposes of load balancing.

In some example, the scheduler 108 performs both load balancing and initial placement of VCIs based on network resource data. In other examples, the scheduler 108 only performs load balancing based on network resource data periodically during runtime of the VCIs. In other examples, the scheduler 108 only performs initial placement of VCIs based on network resource data associated with the VCIs.

The scheduler 108 considers network resource when performing initial placement of a VCI and migrations of VCIs to relieve resource contention. The scheduler in some examples avoids bad placements for VCIs from a network resource aspect and remediates network saturated hosts while considering the CPU and memory as primary resources or first class resources for scheduling purposes. A first class or primary resource is a resource given higher priority or greater consideration than a secondary resource. If CPU is a primary resource and network is a secondary resource, the scheduler 108 prioritizes balancing CPU resource contentions over network considerations.

While described with reference to the network as a secondary resource and the processor and memory as primary resources in some examples, other tiering is contemplated. For example, the network may be viewed as a primary resource while the processor and memory are viewed as secondary resources. In these examples, the network is considered first, and the processor and memory are considered second. In still other examples, all three of these resources are considered to be primary resources and thus considered together.

The scheduler 108 runs on one or more computing devices associated with the data center 110 in this example. In other examples, the scheduler 108 executes on other devices, such as in the cloud or on a remote computing device. In such cases, the scheduling decisions are transmitted to the data center 110 via the network 106 for implementation.

Figure 2:
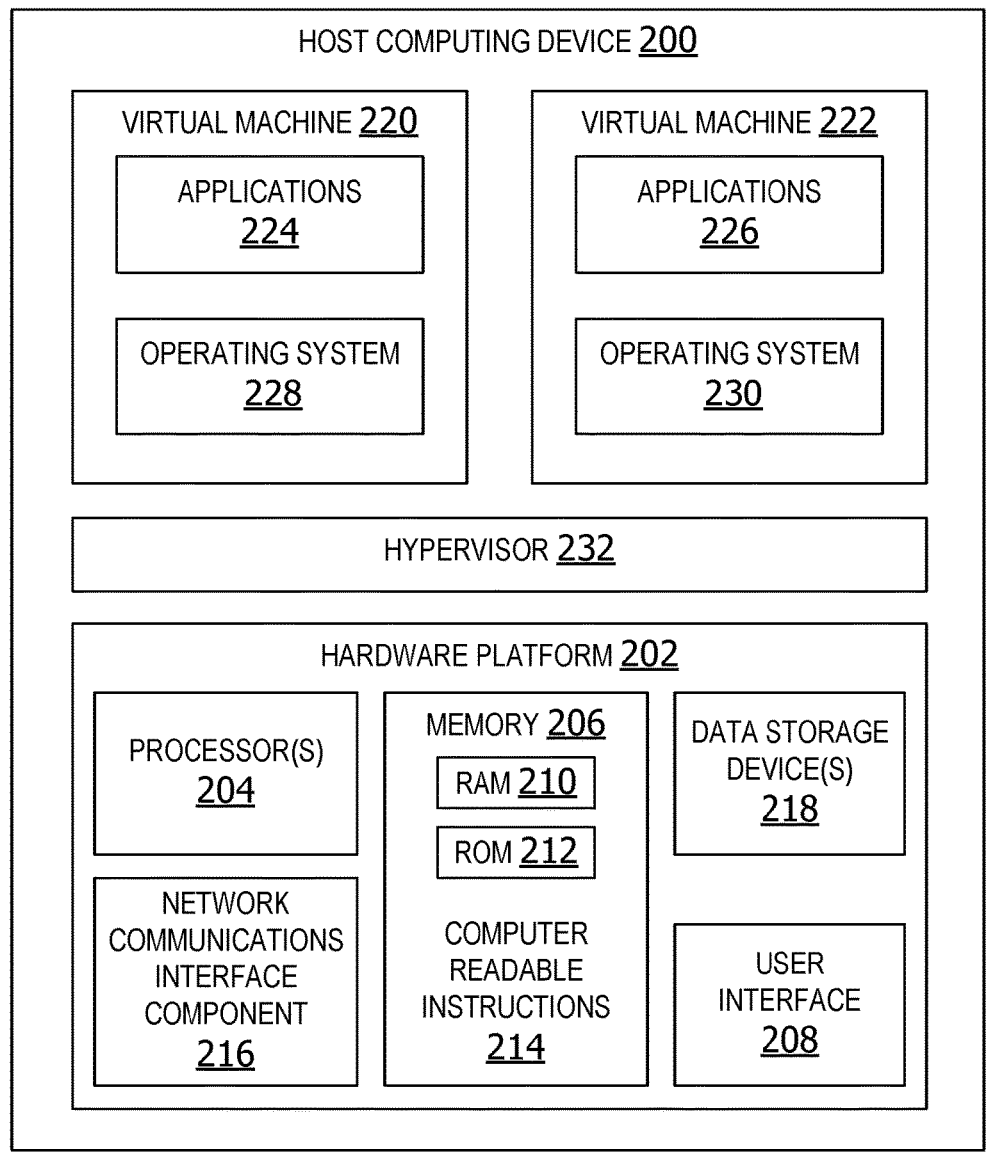
FIG. 2 is an exemplary block diagram illustrating a host computing device.

FIG. 2 is a block diagram of a host computing device supporting one or more VMs. The illustrated host computing device 200 may be implemented as any type of host computing device, such as a server. In some non-limiting examples, the host computing device 200 is implemented as a host or ESXi host from VMware, Inc. The host computing device 200 is a host for running one or more VMs.

The host computing device 200 represents any device executing instructions (e.g., as application(s), operating system, operating system functionality, or both) to implement the operations and functionality associated with the host computing device 200. The host computing device 200 may include desktop personal computers, kiosks, tabletop devices, industrial control devices, or server, such as, but not limited to, a server in the data center 110 in FIG. 1. In some examples, the host computing device 200 is implemented as a blade server within a RSA. Additionally, the host computing device 200 may represent a group of processing units or other computing devices.

The host computing device 200 includes a hardware platform 202. The hardware platform 202, in some examples, includes one or more processor(s) 204, a memory 206, and at least one user interface, such as user interface component 208.

The processor(s) 204 includes any quantity of processing units, and is programmed to execute computer-executable instructions for implementing the examples. The instructions may be performed by the processor or by multiple processors within the host computing device 200, or performed by a processor external to the host computing device 200. In some examples, the one or more processors are programmed to execute instructions such as those illustrated in the figures (e.g., FIG. 7, FIG. 8, and FIG. 9).

The host computing device 200 further has one or more computer readable media, such as the memory 206. The memory 206 includes any quantity of media associated with or accessible by the host computing device 200. The memory 206 may be internal to the host computing device 200, external to the host computing device, or both. In some examples, the memory 206 includes read-only memory (ROM) 212.

The memory 206 further stores a random access memory (RAM) 210. The RAM 210 may be any type of random access memory. In this example, the RAM 210 is part of a shared memory architecture. In some examples, the RAM 210 may optionally include one or more cache(s). The memory 206 further stores one or more computer-executable instructions 214.

The host computing device 200 may optionally include a user interface 208 component. In some examples, the user interface 208 includes a graphics card for displaying data to the user and receiving data from the user. The user interface 208 may also include computer-executable instructions (e.g., a driver) for operating the graphics card. Further, the user interface 208 may include a display (e.g., a touch screen display or natural user interface) and/or computer-executable instructions (e.g., a driver) for operating the display.

The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the hardware platform 202 optionally includes a network communications interface component 216. The network communications interface component 216 includes a network interface card and/or computer-executable instructions (e.g., a driver) for operating the network interface card. Communication between the host computing device 200 and other devices may occur using any protocol or mechanism over any wired or wireless connection. In some examples, the communications interface is operable with short range communication technologies such as by using near-field communication (NFC) tags.

The data storage device(s) 218 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 218 may include rotational storage, such as a disk. The data storage device(s) 218 may also include non-rotational storage media, such as SSD or flash memory.

In some non-limiting examples, the data storage device(s) 218 provide a shared data store. A shared data store is a data storage accessible by two or more hosts in a host cluster.

The host computing device 200 hosts one or more VCIs such as, but not limited to, VMs 220 and 222. The VM 220 in some examples, includes data such as, but not limited to, one or more application(s) 224. The VM 222 in this example includes applications(s) 226. The application(s), when executed by the processor(s) 204, operate to perform functionality on the host computing device 200.

Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In this example, each VM includes a guest operating system (OS). In this example, VM 220 includes guest operating system (OS) 228 and VM 222 includes guest OS 230.

The host computing device 200 further includes one or more computer executable components. Exemplary components include a hypervisor 232. The hypervisor 232 is a VM monitor that creates and runs one or more VMs, such as, but without limitation, VM 220 or VM 222. In one example, the hypervisor 232 is implemented as a vSphere Hypervisor from VMware, Inc.

The host computing device 200 running the hypervisor 232 is a host machine. VM 220 is a guest machine. The hypervisor 232 presents the OS 228 of the VM 220 with a virtual hardware platform. The virtual hardware platform may include, without limitation, virtualized processor, memory, user interface device, and network communication interface. The virtual hardware platform, VM(s) and the hypervisor are illustrated and described in more detail in FIG. 16 below.

Figure 3:
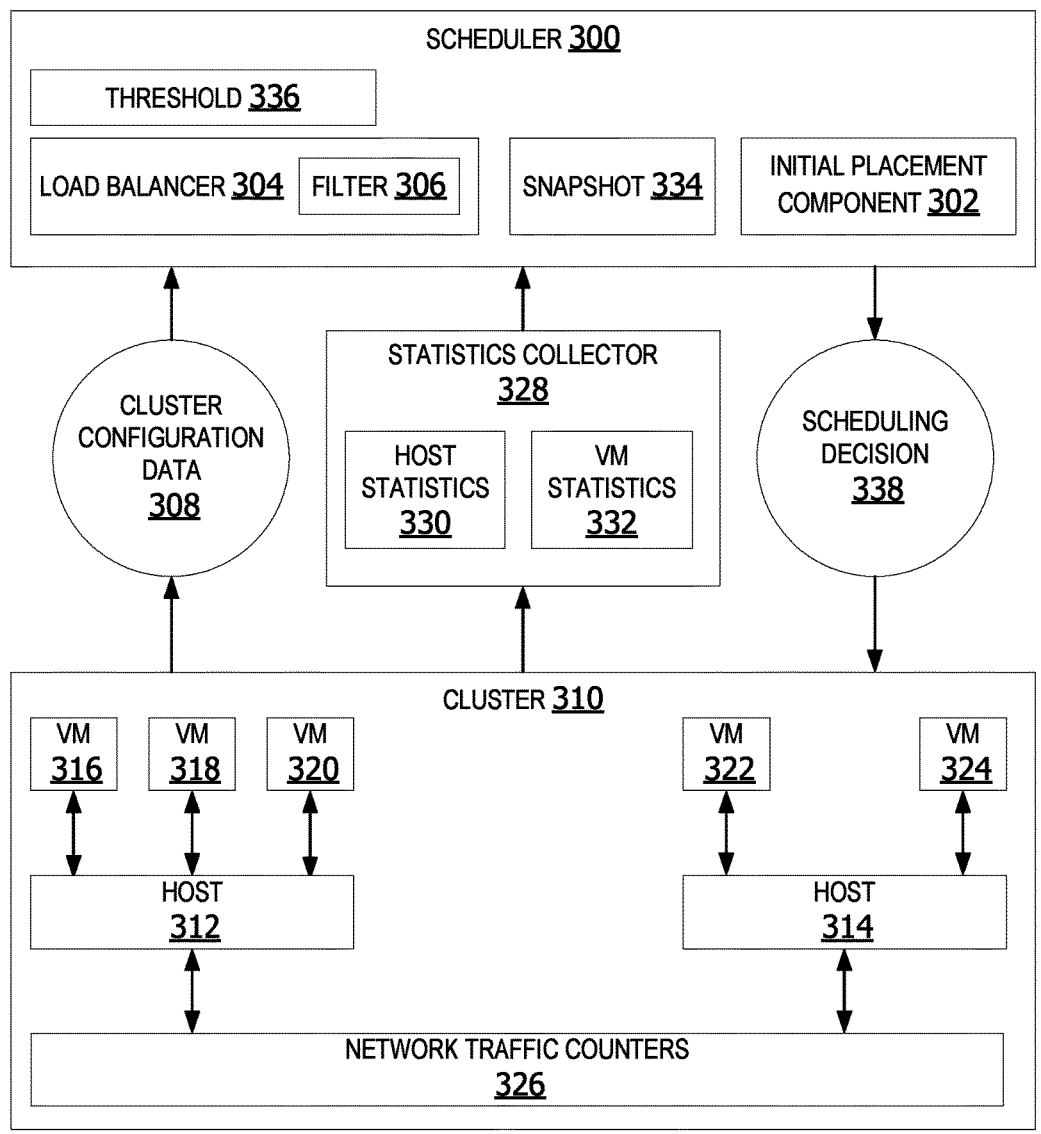
FIG. 3 is an exemplary block diagram illustrating network-utilization based scheduling.

FIG. 3 is an exemplary block diagram illustrating network-utilization based scheduling. The scheduler 300 in this example factors in network resource utilization into scheduling decisions for initial VM placement and VM migrations to remediate resource contention as well as improve application metrics.

The scheduler 300 in this example includes an initial placement component 302. The initial placement component 302 utilizes networking resources for initial placement scheduling decisions. The initial placement component 302 treats the network resource as a second class or secondary resource for the purposes of scheduling decisions and/or optimizing resources within the cluster, in some examples. In other words, the scheduler 300 considers primary resource(s), such as CPU and memory, first when making scheduling decisions. Then the scheduler 300 considers the secondary, network resource. In other examples, there is no two-tiered structure like this, and the resources are all considered at the same time by the scheduler 300.

In still other examples, the scheduler 300 includes a load balancer 304 which migrates a VM so that the CPU or memory contention of another host is remediated without making the networking of the VM suffer by selecting a network saturated host. In other examples, the scheduler 300 includes a filter 306 which filters or rejects potential destination hosts if an initial placement or migration to that host would result in network saturation. If a potential placement or migration to a particular host would alleviate CPU or memory contention while creating network contention, that particular host is filtered, or removed, from the pool of potential destination hosts for the initial placement or migration.

The scheduler 300 receives cluster configuration data 308 associated with cluster 310. Cluster 310 includes a plurality of hosts, such as host 312 and 314. Each host in the cluster 310 supports one or more VMs, such as VM 316, VM 318, and VM 320 on host 312. Likewise, in this non-limiting example, host 314 hosts VM 322 and VM 324. Although VMs are shown in FIG. 3, the hosts in other examples may be associated with one or more containers or other VCIs instead of VMs.

The network-utilization based scheduler 300 in this example includes one or more network traffic counters 326. The network traffic counters 326 collect network traffic data associated with communications between VCIs within the cluster. In some non-limiting examples, the network traffic counters 326 are available at the host level and exposed to the scheduler or virtual controller via a statistics communication channel, such as the statistics channel 416 shown in FIG. 4.

When two VCIs on the same host communicate, internal network traffic is generated on the host supporting the VCIs. When a VCI on one host communicates with a VCI on a different host, external network traffic is generated on both hosts. Typically, external network traffic consumes network resources such as via the network interface card, compared to the internal network traffic.

Therefore, in this example, the scheduler 300 retrieves network traffic data including host internal traffic data and host external traffic data for one or more hosts in the cluster. In some examples, the scheduler obtains network traffic data for every host on the cluster. In other examples, the scheduler only obtains network traffic data for hosts in a candidate set of hosts or hosts in a set of proposed migrations.

The statistics collector 328 is a component for providing host statistics 330 and VM statistics 332 to the scheduler. The scheduler 300 collects statistics from a cluster statistics collector 328. The cluster statistics received from the cluster statistics collector 328 includes host resource capacity, VM resource demand, and VM resource usage. The host resource usage data includes, without limitation, total CPU utilization, total consumed memory, and total network receive and transmit usage. The cluster statistics collector 328 in some examples, provides per-VM usage statistics, such as the VM resource demand and VM resource usage, to the scheduler.

Network traffic between hosts and VMs in a cluster is often unstable. The network traffic frequently includes periods of high usage followed by periods of low usage. The VM network resource usage statistics may be provided using a percentile measure. In these examples, a percent high-water mark may be used for stability in determining network usage. In one non-limiting example, the percent high-water mark is the seventy-fifth percentile. In other examples, a high-water mark of the eightieth percentile may be utilized.

Moreover, in some examples, the cluster statistics include internal send and receive traffic occurring on a single host, as well as external send and receive traffic occurring across different hosts. The external network traffic is more expensive than the internal network traffic. These internal versus external communications traffic statistics are considered to avoid separating VMs during migrations which communicate at a high rate with one another on the same host.

The scheduler retrieves the statistics from the cluster statistics collector 328 to evaluate the cluster status as the VMs are powering-on and/or during load balancing. The scheduler 300 also receives link bandwidth data from the cluster configuration data 308.

In the example shown in FIG. 3, the scheduler 300 is a single component including the load balancer filter 306 and initial placement component 302 receiving runtime data from the statistics collector 328. In other examples, the scheduler 300 includes the initial placement component 302 for performing network-utilization based placements of powering on VCIs but does not include the load balancer 304 filter 306. In still other examples, the scheduler 300 includes the filter 306 for performing network-utilization based migrations but excludes the initial placement component 302.

In yet other examples, the initial placement component 302 and/or filter 306 are located externally or separately from an existing resource scheduler. In these non-limiting examples, the initial placement component 302 and filter 306 may optionally be implemented on a remote computing device. In still other non-limiting examples, the initial placement component 302 and/or filter may optionally be implemented as one or more plug-ins to an existing resource scheduler.

Figure 4:
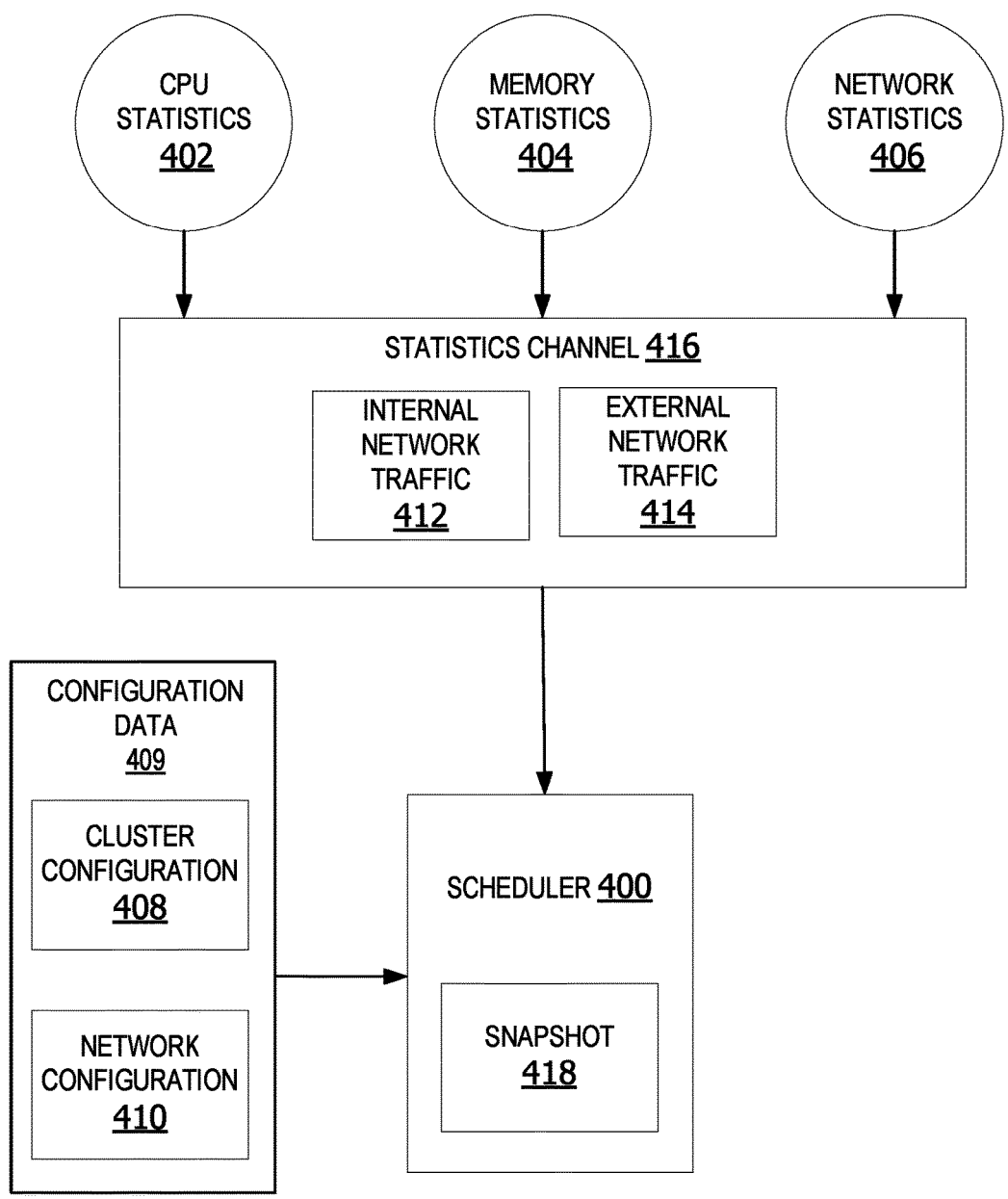
FIG. 4 is an exemplary block diagram illustrating a statistics channel for transmitting runtime statistics to the scheduler.

FIG. 4 is an exemplary block diagram illustrating a statistics channel for transmitting runtime statistics to the scheduler. The scheduler 400 performs scheduling based on runtime statistics obtained regarding the hosts and the VCIs, as well as configuration data 409. The runtime statistics include the VCIs' CPU statistics 402, memory statistics 404, and network statistics 406. The runtime statistics include memory, CPU, and network consumption and hosts total CPU, memory, and network utilization. The network statistics 406 include internal network traffic 412 and external network traffic 414.

A selected VCI proposed for migration by the scheduler 400 based on CPU and memory resource load balancing, may communicate with other VCIs. These other VCIs may reside either on the same host as the selected VCI or in different hosts. That means the VCI may have external network traffic with the other VCIs associated with different hosts and/or internal network traffic with other VCIs supported on the same host as the selected VCI. When the selected VCI is moved from a first host to a second host, the external network traffic no longer impacts the first host but the prior internal network traffic now becomes new external network traffic for the first host.

In this non-limiting example, the scheduler 400 obtains separate utilization statistics for internal network traffic 412 and external network traffic 414 for VCIs for both transmit (Tx) and receive (Rx) directions, in addition to the current utilization metrics. In some examples, the internal network traffic 412 and external network traffic 414 are collected by counters, such as the network traffic counters 326 in FIG. 3.

While the scheduler 400 receives the runtime statistics data via a statistics channel 416, the scheduler 400 in some examples also receives configuration data 409 including cluster configuration 408 data and network configuration 410 data. The inputs from VCI configuration include VCIs' configured size, as well as their resource settings. The configured size includes, for example but without limitation, total memory and/or number of cores. The resource settings include reservations, limits, and shares. The inputs from host configuration include hosts' CPU capacity, memory capacity, and networking capacity (bandwidth).

The scheduler 400 generates the current cluster status snapshot 418 based on the runtime statistics and the configuration data 409. The snapshot 418 is utilized by the scheduler 400 to generate network-utilization based scheduling decisions for initial placement of VCIs and VCI migrations for load balancing.

Figure 5:
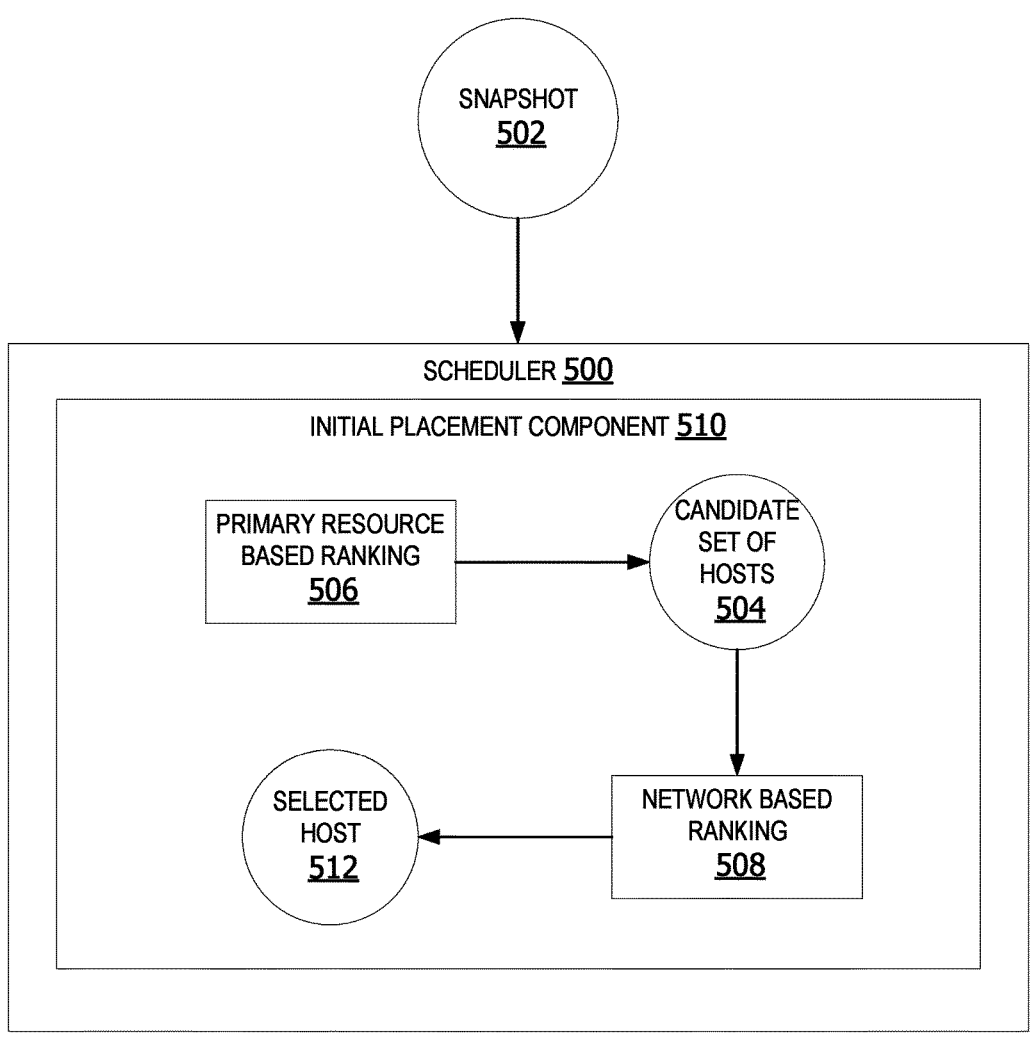
FIG. 5 is an exemplary block diagram illustrating an initial placement component of the scheduler.

FIG. 5 is an exemplary block diagram illustrating an initial placement component of the scheduler. The scheduler 500 runs in on-demand fashion when a VCI is powered-on. At each invocation of the scheduler, a snapshot 502 representing the current status of the cluster is created. This snapshot 502 contains configuration data as well as runtime statistics associated with the cluster. The snapshot 502 contains the current VCI placements.

During the initial placement, when a VCI is powered on, the scheduler selects a host for placement of the VCI that maintains host utilization such that that standard deviation of utilization is minimized. The VCI's actual resource utilization is unknown at initial placement. The scheduler 500 uses an estimation of VCI utilization based on the VCI's configured size as its entitlements for CPU and memory when calculating the standard deviation.

The scheduler 500 considers availability of networking resources to avoid over-utilizing network resource of some hosts. In this example, the scheduler 500 uses a standard deviation based scheduling algorithm to obtain a list of hosts ranked best to worst from the standard deviation aspect. The scheduler 500 uses the top ranked hosts from this list to select a candidate set of hosts 504 during a first level analysis. The candidate set of hosts 504 is a user defined number of the top ranked hosts in the list of hosts. The scheduler 500 further analyzes the candidate set of hosts 504 to select a host for the powering-on VCI considering CPU, memory, and network resources. The powering-on VCI is placed on the selected host 512.

In this example, the primary resource based ranking 506 generates the candidate set of hosts 504 for the second level analysis by comparing the standard deviation difference against a threshold. The threshold is a user controllable or user-defined threshold setting in the cluster used for load balancing decisions. The threshold indicates a magnitude of imbalance in the cluster (overall standard deviation) which triggers a migration.

In some examples, when the initial placement component 510 outputs the ranked host list along with the overall standard deviation (imbalance after the VCI placement), the primary resource based ranking selects hosts below the threshold to ensure the subsequent load balancing phase does not trigger a migration due to this initial placement. In other examples, hosts having a ranking that equals or exceeds the threshold are filtered or rejected.

During the second level host selection performed by the network based ranking 508, the scheduler selects the best host from the short-listed hosts in the candidate set of hosts for power-on operation. This ranking is based on CPU, memory, and network resources. The scheduler 500 utilizes a dot product algorithm to select the best host using the VCI's CPU, memory, and networking demands as well as hosts' available capacity. In some examples, the dot product between a VCI's resource demand vector and a host's available resource vector gives the best packing efficiency for the cluster. However, other ways to select the best host are contemplated.

In some examples, the scheduler 500 uses entitlements of the CPU and memory calculated by the DRS algorithm for the demands. For networking resources, the scheduler assumes the VCI will use its entire capacity of virtual network interface card (vNIC) and use the capacity of the vNIC as its demand. For the host's available capacity, the scheduler deducts the sum of the entitlements of the other running VCIs on that host from the host's total capacity for CPU and memory resources. For networking resources, the scheduler in some examples deducts the current utilization from total capacity to obtain the available capacity. The current utilization is an average over a given time period. For example, the current utilization may be, without limitation, the average over the last minute. Once the dot product algorithm emits the dot product between the VCI demand vector and each host's available capacity vector, the scheduler identifies a selected host 512 that maximizes the dot product.

Figure 6:
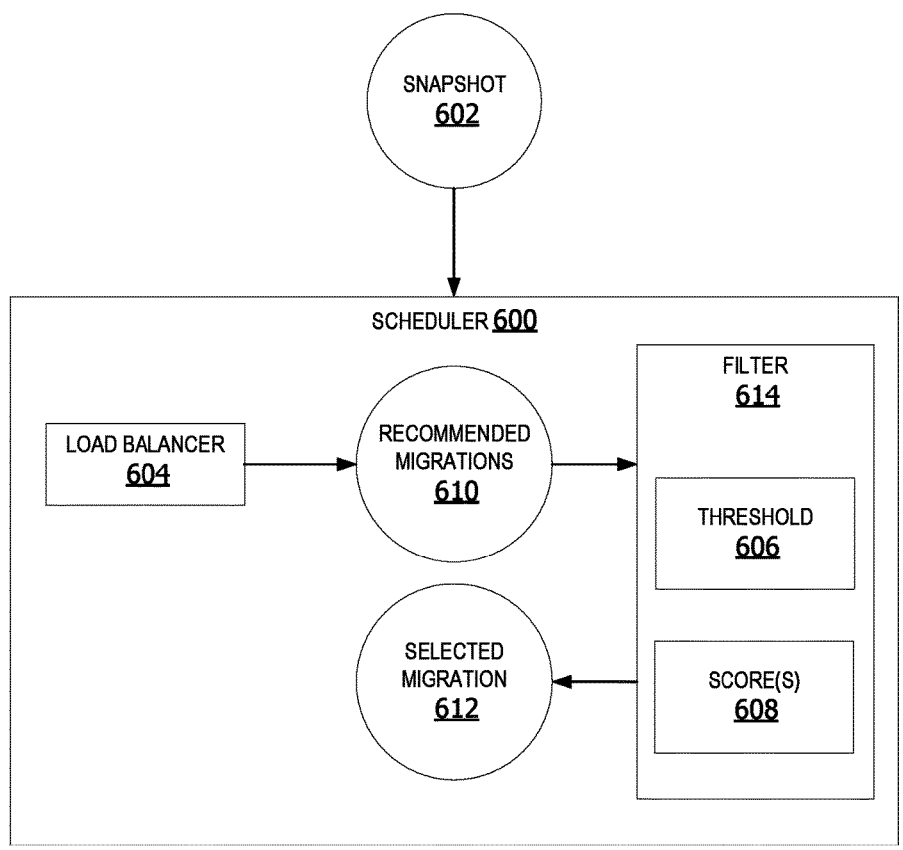
FIG. 6 is an exemplary block diagram illustrating a filter component of the scheduler.

FIG. 6 is an exemplary block diagram illustrating a filter component of the scheduler. The scheduler 600 runs periodically to balance the load in the cluster. The scheduler in this non-limiting example is invoked to perform load-balancing at an occurrence of a predetermined time interval. The predetermined time interval may be a user defined amount of time or a default period.

In some examples, the scheduler 600 evaluates one or more proposed migration(s) 610 from a load balancer 604 to determine whether the proposed migration(s) would resolve an existing network saturation, create additional network saturation, or have minimal/no effect on network utilization.

At each invocation of the scheduler, a snapshot 602 representing the current status of the cluster is created. This snapshot 602 contains configuration data, runtime statistics associated with the cluster, and VM placements. The scheduler 600 analyzes the snapshot 602 to determine impact of a proposed migration on network utilization.

The scheduler 600 performs migrations of VCIs to maintain balance of cluster resources across hosts. The resource utilization is calculated using the normalized entitlement. The term "balance" refers to the standard deviation of the host utilization histogram within a user defined acceptable threshold 606.

The scheduler 600 maintains balance with respect to CPU and memory resources while placing VCIs where the network resource is available and avoids network saturation when performing load balancing. In other examples, the scheduler 600 performs remediation actions during load balancing phases to prevent host network saturation.

In some examples, the load balancer 604 executes periodically as an asynchronous task in a virtual controller associated with the cluster. The virtual controller may be implemented as a vCenter server from VMware. The load balancer 604 evaluates the load on each host of the cluster and proposes migrations to reduce any imbalance of the host load to below a user configured threshold 606. The load balancer 604 in some examples runs a greedy hill climbing algorithm which performs an exhaustive search at each step to find the best move that minimizes the imbalance in the cluster.

The proposed migrations from the load balancer 604 may be harmful from a networking perspective because the load balancer 604 in this example only considers CPU and memory resources. For example, a host may have few VMs which are networking intensive and the host's physical network interface card (pNIC) may be close to saturation. However, the CPU and memory resources may be free in this host compared to other hosts in the cluster. If the load balancer 604 brings a new VM that is network intensive into this host, the VCIs in this host will suffer from the network resource aspect.

The scheduler 600 prevents such harmful migrations proposed by the load balancer 604 and performs remediation tasks if a host is already in network saturation. Remediation refers to moving a network intensive VM or other VCI away from a network saturated host and onto a network unsaturated host.

The filter 614 filters proposed migrations while treating network resource as secondary to other resources, such as memory and processor resources. In other words, when the processor and memory based primary evaluation is complete during a first level (e.g., by the load balancer 604), the filter performs a second level re-evaluation of the proposed migrations based on the network resources.

In some examples, during the second level re-evaluation, the scheduler 600 generates one or more network utilization score(s) 608 for each destination host in a set of one or more proposed migration(s) 610. A proposed migration is a recommendation to move a VCI from a source host to a destination host within the cluster. A proposed migration may recommend a single move or recommend multiple moves. For example, a proposed migration may recommend a move of a first VCI from a first host to a second host and a move of a second VCI from the first host to a third host.

The filter 614 generates each score based on data provided in the current cluster status snapshot 602. The snapshot 602 includes internal network traffic and external network traffic data for each destination host in the proposed migration(s) 610. In some examples, the snapshot 602 also includes external network traffic data and external network traffic data for each source host in the proposed migration(s) 610.

The filter 614 compares the generated scores to filter or approve proposed migrations based on an impact of the proposed migration on network utilization within the cluster. The filter 614 compares scores and rejects proposed migrations associated with the greatest negative impact on network saturation and/or network contention.

In some examples, the filter 614 rejects proposed migrations which would result in a network saturation and/or network contention on a destination host. This check ensures the scheduler 600 avoids migrations having a negative impact on network resources with regard to one or more hosts in the cluster. For example, if a destination host for a proposed migration is network saturated and the VCI to be moved includes a network load, the proposed migration is rejected.

In another example, the filter 614 selects or prioritizes migrations to network unsaturated hosts. This assists in resolving existing host network resource saturation on one or more hosts. For example, if a destination host A for a first proposed migration is network saturated and a destination host B for a second proposed migration is network unsaturated, the filter 614 rejects or filters the first proposed migration to the network saturated host and permits or prioritizes the second proposed migration to the network unsaturated host.

In another example, the filter 614 favors a migration that would move a VCI away from a network saturated host to resolve an existing host network resource saturation. For example, if a first proposed migration would move a VCI from a network saturated source host A and a second proposed migration would move a VCI off a network unsaturated source host B, the filter approves or prioritized the second proposed migration to alleviate the network saturation on host B. In this example, the first proposed migration creates a non-negative contribution to resolve the cluster imbalance.

In other examples, the filter 614 favors a first proposed migration that would move a VCI from a network unsaturated host instead of a second proposed migration moving a VCI from a network saturated host if the move significantly reduces cluster load imbalance. This ensures the scheduler 600 prefers the CPU and memory load balancing by prioritizing the proposed migrations that resolve the cluster imbalance to the greatest degree.

In another example, the filter 614 selects a first proposed migration of a VCI to a network saturated host A instead of a second proposed migration of a VCI to a network unsaturated host B if the first proposed migration significantly reduces load imbalance with regard to processor and memory more than the second proposed migration. The first proposed migration may also be favored in cases where the VCI has little or no network load associated with the VCI. In such cases, the network impact of the proposed move may be negligible while the processor and memory impact of the move is significant.

In yet other examples, the filter 614 performs a strict imbalance change comparison if the source host in two or more proposed migrations are saturated. A move from any of the saturated hosts would assist in alleviating the existing host network resource saturation. A strict imbalance change comparison is performed by comparing the score for each proposed migration. The proposed migration associated with the score indicating the greatest positive impact on CPU and memory resources is selected. This enables the scheduler 600 to strictly consider the contribution to resolve the cluster load imbalance.

In some examples, moves that migrate a VM to a network saturated host are rejected outright.

Figure 7:
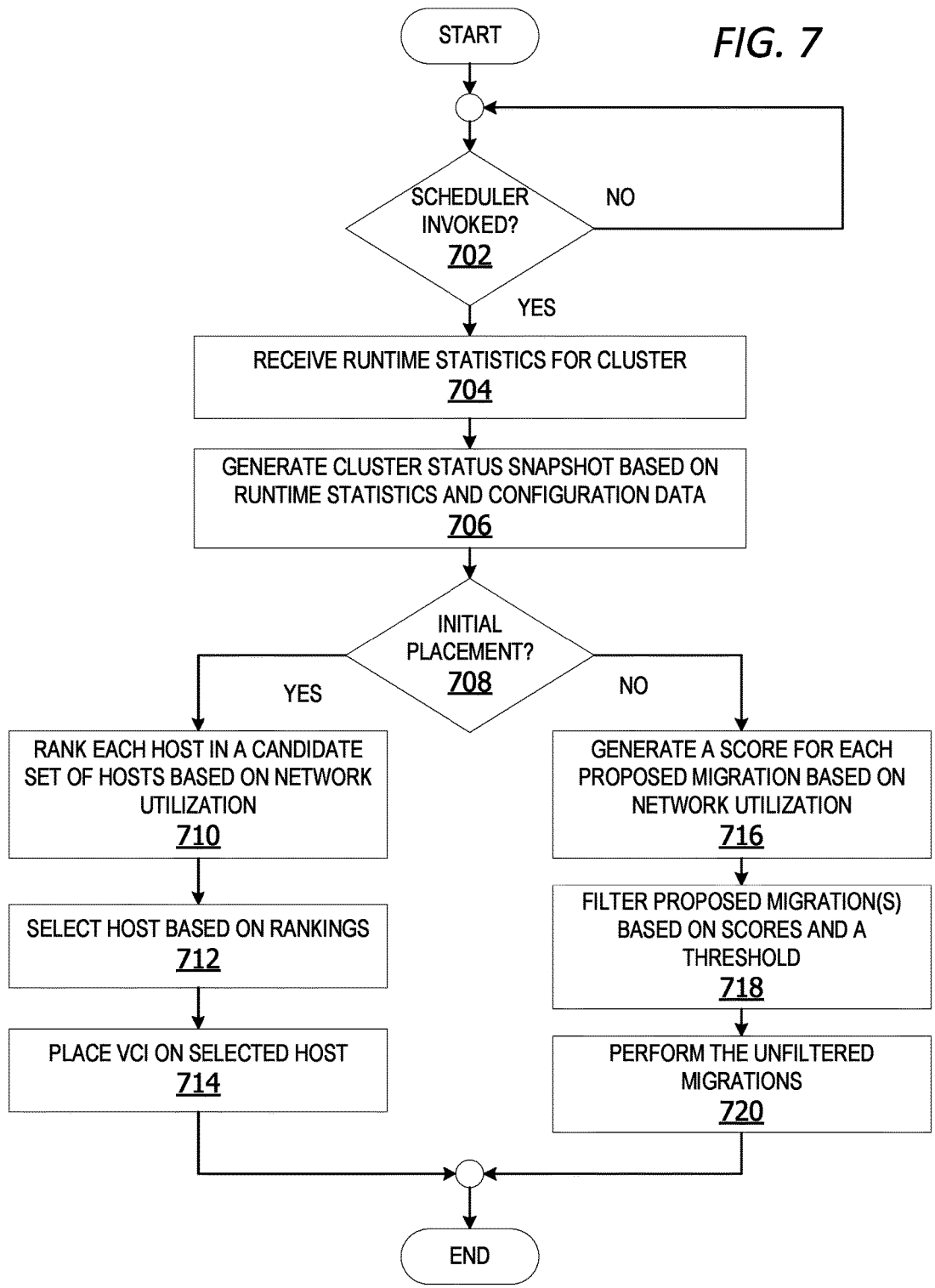
FIG. 7 is an exemplary flow chart illustrating operation of the scheduler utilizing network as a secondary resource.

FIG. 7 is an exemplary flow chart illustrating operation of the scheduler utilizing network as a secondary resource. The process shown in FIG. 7 may be performed by a scheduler on a computing device, such as, but not limited to, the scheduler 108 in FIG. 1, scheduler 300 in FIG. 3, scheduler 400 in FIG. 4, scheduler 500 in FIG. 5, and/or scheduler 600 in FIG. 6. The computing device may be implemented as a computing device such as, but not limited to, a server associated with the data center 110, host computing device 200 in FIG. 2, host computing device 1500, or host computing device 1600 in FIG. 16. Further, execution of the operations illustrated in FIG. 7 is not limited to a scheduler. One or more computer-readable storage media storing computer-readable instructions may execute to cause at least one processor to implement the operations illustrated in FIG. 7.

A determination is made as to whether the scheduler is invoked at 702. If yes, runtime statistics for the cluster are received at 704. A cluster snapshot is generated based on runtime statistics and configuration data at 706.

A determination is made as to whether this is an initial placement of a VCI at 708. If yes, each host in a candidate set of hosts is ranked based on network utilization at 710. A host is selected based on the rankings at 712. The VCI is placed on the selected host at 714. The process terminates thereafter.

Returning to 708, if the proposed migration is not an initial VCI placement, a score is generated for each proposed migration based on network utilization at 716. Proposed migrations are filtered based on the scores and a threshold at 718. In some examples, proposed migrations having a score that equals or exceeds the threshold are filtered.

The unfiltered migrations are performed at 720. The process terminates thereafter.

While the operations illustrated in FIG. 7 are described as being performed by a host computing device or a server, aspects of the disclosure contemplate that performance of the operations by other entities. For example, a cloud service may perform one or more of the operations.

Figure 8:
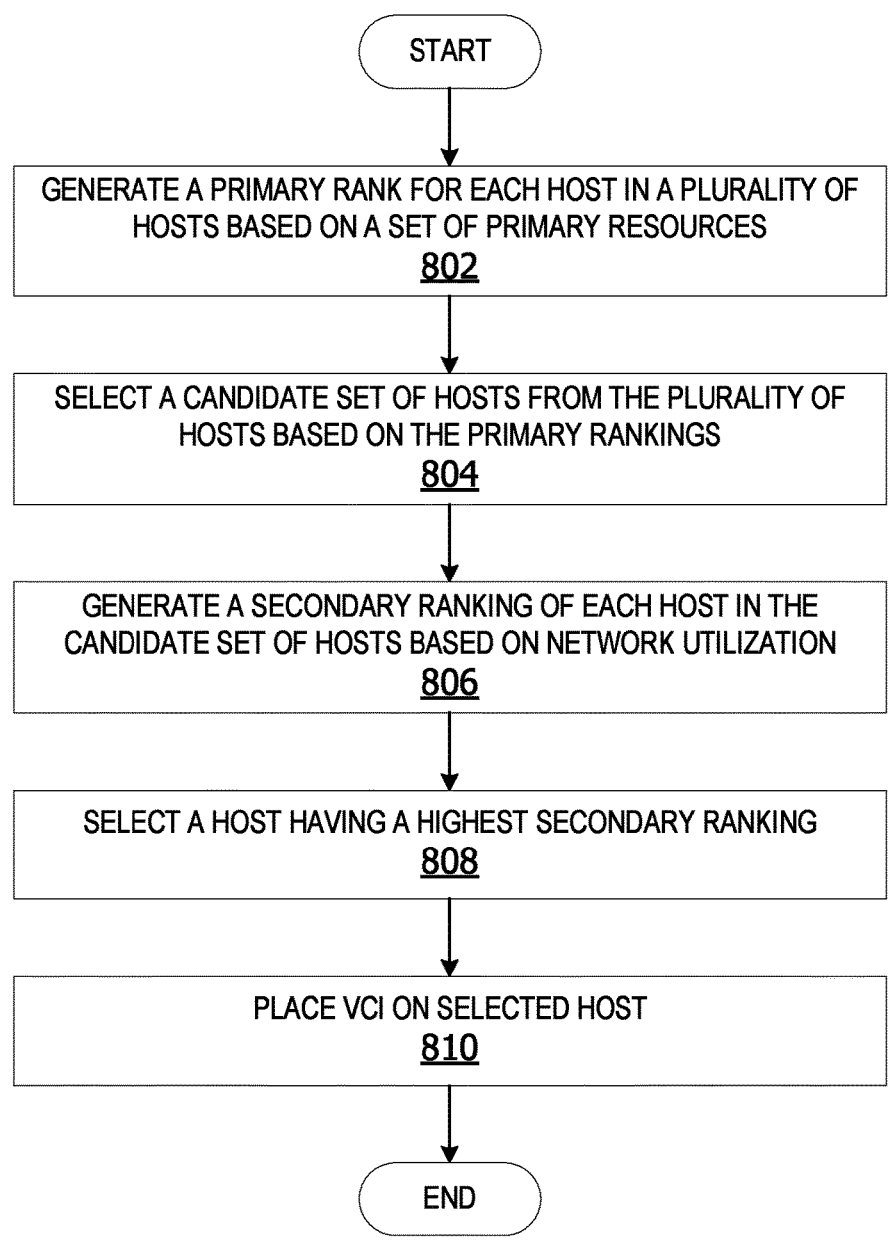
FIG. 8 is an exemplary flow chart illustrating operation of a scheduler for initial placement of a virtual computing instance (VCI) based on network utilization.

FIG. 8 is an exemplary flow chart illustrating operation of a scheduler for initial placement of a virtual computing instance (VCI) based on network utilization. The process shown in FIG. 8 may be performed by a scheduler on a computing device, such as, but not limited to, the scheduler 108 in FIG. 1, scheduler 300 in FIG. 3, scheduler 400 in FIG. 4, and/or scheduler 500 in FIG. 5. The computing device may be implemented as a computing device such as, but not limited to, a server associated with the data center 110, host computing device 200 in FIG. 2, host computing device 1500, or host computing device 1600 in FIG. 16. Further, execution of the operations illustrated in FIG. 8 is not limited to a scheduler. One or more computer-readable storage media storing computer-readable instructions may execute to cause at least one processor to implement the operations illustrated in FIG. 8.

A primary rank is generated for each host in a plurality of hosts based on a set of primary resources at 802. A candidate set of hosts is selected from the plurality of hosts based on the primary rankings at 804. A secondary ranking of each host in the candidate set of hosts is generated based on network utilization at 806. A host having a highest secondary ranking is selected at 808. The process terminates thereafter. The VCI is placed on the selected host at 810.

In this example, the host having the highest secondary ranking is selected. The highest secondary ranking is a best rank. The highest secondary ranking may be the highest rank in a set of ranks. However, in other examples, the highest ranking may be a ranking that is within a selected range but not necessarily the rank having the highest value.

While the operations illustrated in FIG. 8 are described as being performed by a host computing device or a server, aspects of the disclosure contemplate that performance of the operations by other entities. For example, a cloud service may perform one or more of the operations.

Figure 9:
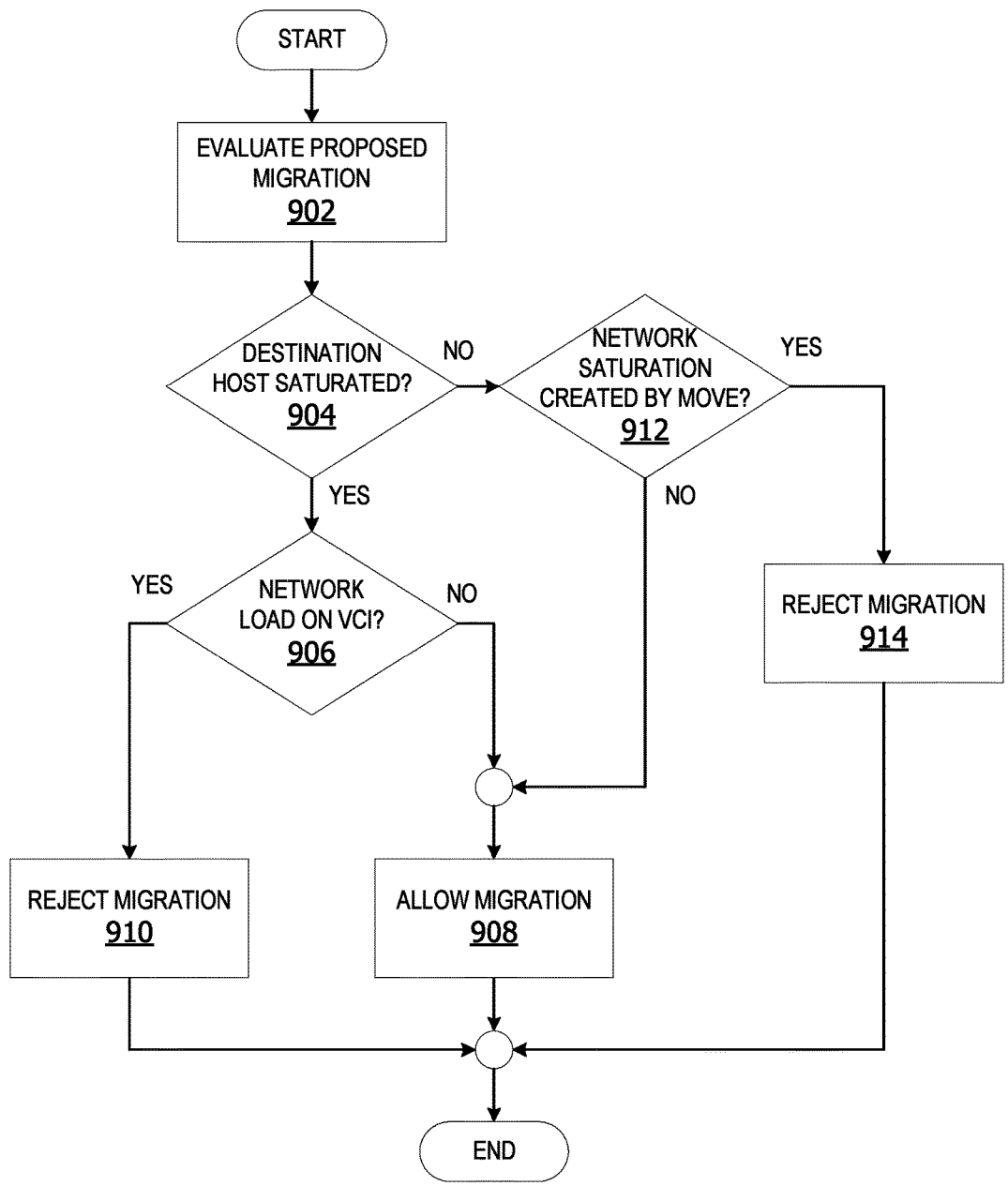
FIG. 9 is an exemplary flow chart illustrating operation of a scheduler for load balancing based on network utilization.

FIG. 9 is an exemplary flow chart illustrating operation of a scheduler for load balancing based on network utilization. The process shown in FIG. 9 may be performed by a scheduler on a computing device, such as, but not limited to, the scheduler 108 in FIG. 1, scheduler 300 in FIG. 3, scheduler 400 in FIG. 4, and/or scheduler 600 in FIG. 6. The computing device may be implemented as a computing device such as, but not limited to, a server associated with the data center 110, host computing device 200 in FIG. 2, host computing device 1500, or host computing device 1600 in FIG. 16. Further, execution of the operations illustrated in FIG. 9 is not limited to a scheduler. One or more computer-readable storage media storing computer-readable instructions may execute to cause at least one processor to implement the operations illustrated in FIG. 9.

A proposed migration is evaluated at 902. A determination is made as to whether a destination host is saturated at 904. If yes, a determination is made as to whether a network load is on the VCI at 906. If yes, the proposed migration is rejected at 910. The process terminates thereafter.

Returning to 904, if the VCI does not have a network load, the migration is allowed at 908. The process terminates thereafter.

Returning to 904, if the host is not network saturated, a determination is made as to whether network saturation is created by the proposed move at 912. If no, the migration is allowed at 908. The process terminates thereafter.

Returning to 912, if network saturation is created by the proposed move, the proposed migration is rejected at 914. The process terminates thereafter.

While the operations illustrated in FIG. 9 are described as being performed by a host computing device or a server, aspects of the disclosure contemplate that performance of the operations by other entities. For example, a cloud service may perform one or more of the operations.

In FIG. 10, FIG. 11, FIG. 12, FIG. 13, and FIG. 14, cluster experiments are utilized to highlight the gaps in prior art (legacy DRS) scheduler. FIG. 10, FIG. 11, FIG. 12, FIG. 13, and FIG. 14 also illustrate strengths in the network-utilized based scheduler, such as, but not limited to, scheduler 108 in FIG. 1, scheduler 300 in FIG. 3, scheduler 400 in FIG. 4, scheduler 500 in FIG. 5, or scheduler 600 in FIG. 6.

In one experiment, a netperf client is used to generate network load at each VM with a pre-determined network requirement which generates a stream of Transmission Control Protocol (TCP) packets to a server located outside of the cluster. The cluster may be implemented as a vSphere cluster by VMWare.

The clusters include two or three hosts in these experiments. The hosts include four (4) CPU cores each at 2.8 gigahertz (GHz) and 6 gigabytes (GB) of random access memory. Each host has two (2) network interface cards (NICs) with one (1) GB per second (ps) capacity and only one of them is used for VM traffic. Internal testing utilities are utilized to generate pre-determined CPU and memory workloads.

The network-utilization based scheduler considers network resource as a secondary resource when performing initial placement and remediation of resource contention. The network-utilization based scheduler performs initial placement by two level ranking algorithm, which first considers CPU and memory resources only and then considers all three resources (CPU, memory, and network) in the second level. For resource contention remediation, the network-utilization based scheduler filters-out proposed migrations which move VMs to hosts which are network saturated, even if it improves the CPU and memory condition. It performs remediation to the host network saturation by prioritizing the migrations which move VMs out of network saturated hosts.

In FIG. 10, FIG. 11, and FIG. 12, the resource utilization on hosts is varied in the cluster and attempted to power-on VM in the cluster. Varying the load on hosts is accomplished by placing some VMs and running load generating tools for each resource types in these VMs. The VM is powered-on by both an existing resource scheduler and the network-utilization based scheduler of the disclosure.

FIG. 10 is an exemplary table illustrating results of a first initial placement experiment. In the first initial placement experiment, two VMs (VM1 and VM2) are placed in a first host (H1) and a second host (H2) respectively. These VMs have similar memory utilization. VM2 on H2 uses more CPU while VM1 uses high network. Thus, H1 is more network utilized while H2 is more CPU utilized. Table 1000 illustrates the placement results.

When a VM is placed, an existing resource scheduler selects H1 since H2 is more CPU utilized. However, the network-utilization based scheduler of the present disclosure selects H2 because H1 is more utilized from both CPU and network perspectives. The memory utilization is equal for both hosts.

FIG. 11 is an exemplary table illustrating results of a second initial placement experiment. In the second initial placement experiment, CPU utilization is equal across the two hosts. The memory and network utilization is varied. H1 has a higher network utilization and lower memory utilization compared to H2. As shown in table 1100, when a VM is powered on, an existing resource scheduler selects H1 based on CPU and memory utilization. The network-utilization based scheduler of the disclosure, however, selects H2 based on CPU, memory, and network utilization.

FIG. 12 is an exemplary table illustrating results of a third initial placement experiment. In this example, H1 associated with VM1 has a medium CPU load and a medium network load. H2 associated with VM2 includes a high CPU load and medium network load. Host 3 associated with VM3 has a low CPU load and high network load. When the VM is powered on, an existing resource scheduler places it on host 3 based on CPU and memory utilization. However, the network-utilization based scheduler of the disclosure places the VM on H1 because it is the best considering CPU, memory, and network resources. Table 1200 shoes the details of this third initial placement experiment.

In FIG. 13 and FIG. 14, the experiments begin with an initial state of the cluster regarding resource utilization and location of each VM. FIG. 13 and FIG. 14 illustrate results of load balancing workflow run by an existing resource scheduler as well as the network-utilization based scheduler of the disclosure.

FIG. 13 is an exemplary table illustrating results of a first load balancing experiment. In this example, H1 includes 2 VMs (VM1 and VM2) which has high CPU utilization and low network utilization. H2 has a single VM (VM3) which has low CPU utilization and high network utilization which saturates H2's network utilization. When an existing resource scheduler (e.g., load balancer) is run, it moves VM2 from H1 to H2 to balance the CPU resource utilization across hosts in the cluster. However, this denies VM2's access to the network resource at H2 because the network resource at H2 is already saturated by VM3.

The network-utilization based scheduler of the disclosure understands this situation and prevents VM2 moving to H2 even though the cluster CPU utilization is somewhat imbalanced. Table 1300 illustrates these results.

FIG. 14 is an exemplary table illustrating results of a second load balancing experiment. H1 includes VM 1 and VM2. These two VMs have high CPU utilization and low network utilization. H2 includes a single VM (VM3) which has medium CPU utilization and a no network utilization.

Host 3 (H3) has VM4, which has low CPU utilization and high network utilization which saturates H3's network resource. When an existing resource scheduler (e.g., load balancer) is run, it moves VM2 from H1 to H3 to balance the CPU resource utilization across hosts in the cluster. However, this denies VM2's access to the network resource at H3 because the network resource at H3 is already saturated by VM4.

The network-utilization based scheduler of the disclosure avoids H3 due to network resource saturation. The network-utilization based scheduler moves VM2 to H2 to relieve high CPU utilization at H1, as shown in table 1400.

Figure 15:
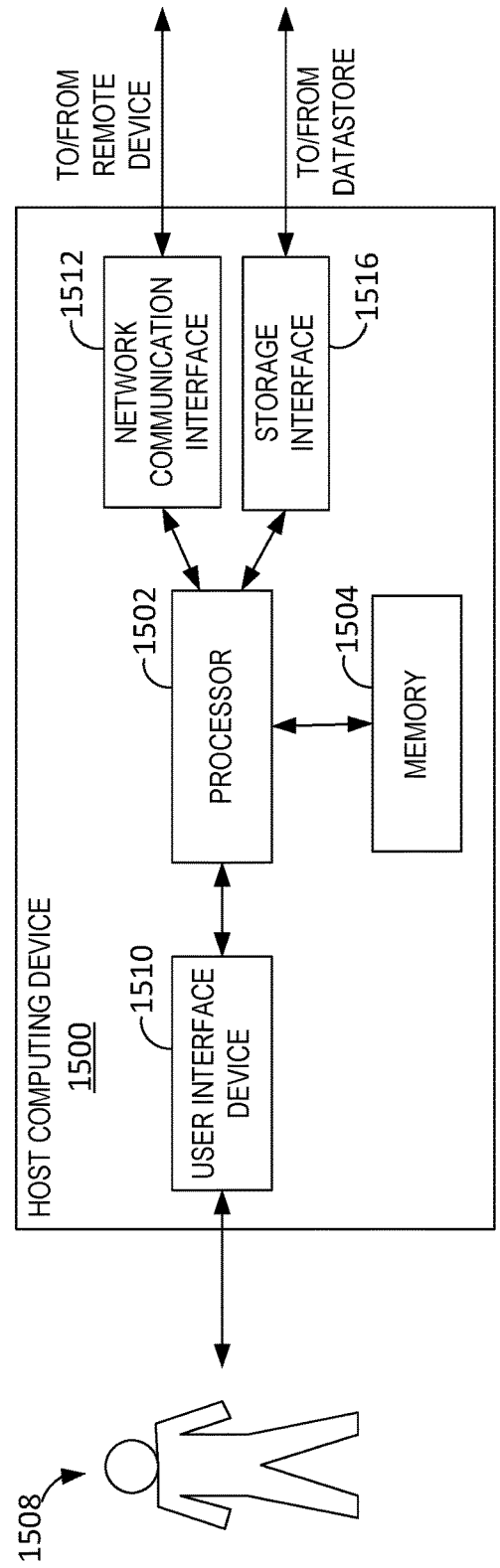
FIG. 15 is a block diagram of an example host computing device.

FIG. 15 is a block diagram of an example host computing device. A host computing device 1500 includes a processor 1502 for executing instructions. In some examples, executable instructions are stored in a memory 1504. Memory 1504 is any device allowing information, such as, but not limited to, executable instructions, to be stored and retrieved. For example, memory 1504 may include one or more random access memory (RAM) modules, flash memory modules, hard disks, solid state disks, and/or optical disks.

Host computing device 1500 may include a user interface device 1510 for receiving data from a user 1508 and/or for presenting data to user 1508. User 1508 may interact indirectly with host computing device 1500 via another computing device such as VMware's vCenter Server or another management device. User interface device 1510 may include, for example, a keyboard, a pointing device, a mouse, a stylus, a touch sensitive panel (e.g., a touch pad or a touch screen), a gyroscope, an accelerometer, a position detector, and/or an audio input device.

In some examples, the user interface device 1510 operates to receive data from the user 1508, while another device (e.g., a presentation device) operates to present data to user 1508. In other examples, the user interface device 1510 has a single component, such as a touch screen, that functions to both output data to user 1508 and receive data from the user 1508. In such examples, the user interface device 1510 operates as a presentation device for presenting information to user 1508. In such examples, the user interface device 1510 represents any component capable of conveying information to user 1508. For example, the user interface device 1510 may include, without limitation, a display device (e.g., a liquid crystal display (LCD), organic light emitting diode (OLED) display, or "electronic ink" display) and/or an audio output device (e.g., a speaker or headphones). In some examples, the user interface device 1510 includes an output adapter, such as a video adapter and/or an audio adapter. An output adapter is operatively coupled to the processor 1502 and configured to be operatively coupled to an output device, such as a display device or an audio output device.

The host computing device 1500 also includes a network communication interface 1512, which enables the host computing device 1500 to communicate with a remote device (e.g., another computing device) via a communication medium, such as a wired or wireless packet network. For example, the host computing device 1500 may transmit and/or receive data via the network communication interface 1512. The user interface device 1510 and/or network communication interface 1512 may be referred to collectively as an input interface and may be configured to receive information from the user 1508.

The host computing device 1500 further includes a storage interface 1516 that enables the host computing device 1500 to communicate with one or more data stores, which store virtual disk images, and/or software applications suitable for use with the methods described herein. In example examples, the storage interface 1516 couples the host computing device 1500 to a storage area network (SAN) (e.g., a Fibre Channel network) and/or to a network-attached storage (NAS) system (e.g., via a packet network). The storage interface 1516 may be integrated with network communication interface 1512.

Figure 16:
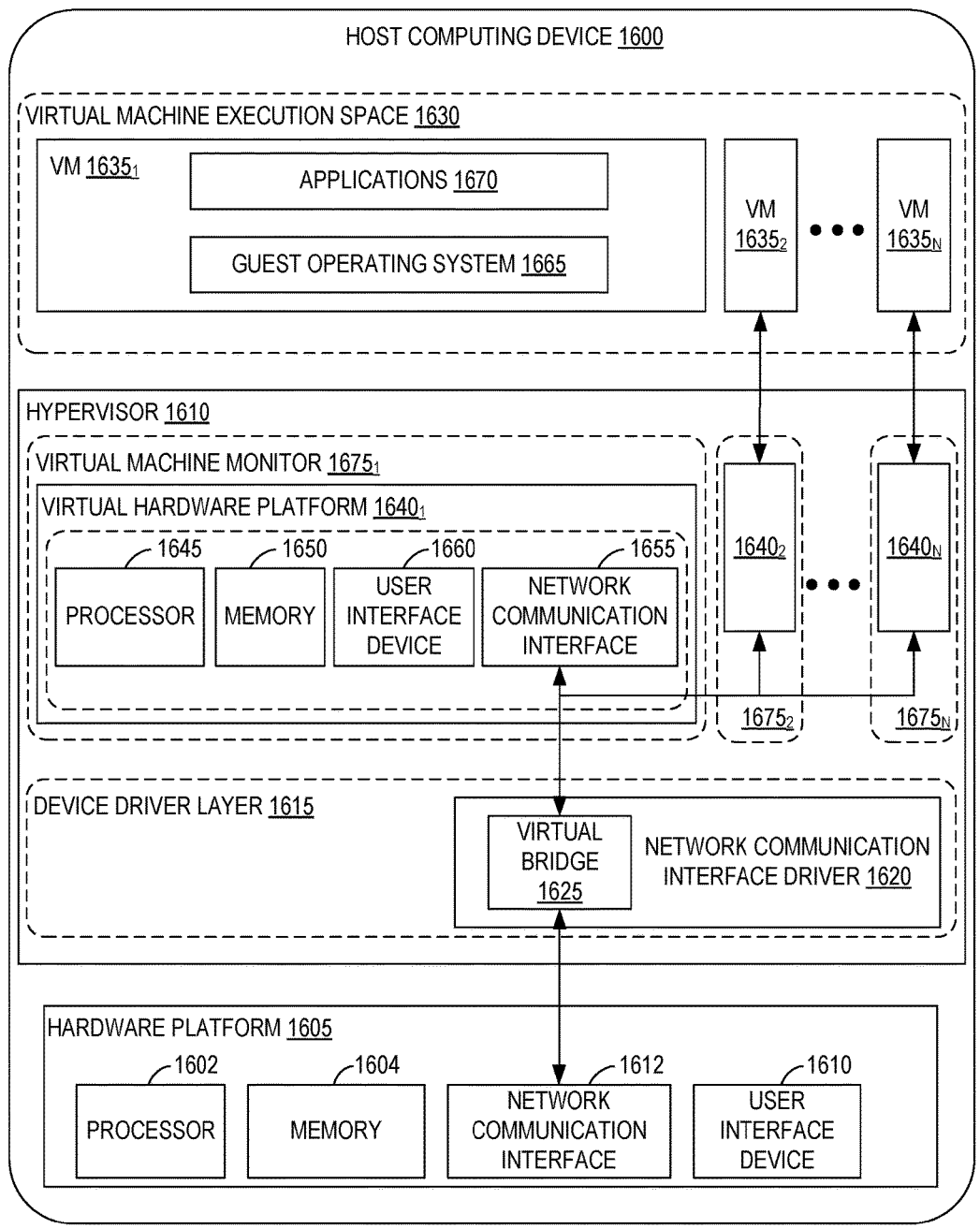
FIG. 16 is a block diagram of VMs instantiated on a host computing device.

FIG. 16 depicts a block diagram of VMs 1635$_1$, 1635$_2$ . . . 1635$_N$ that are instantiated on host computing device 1600. The host computing device 1600 includes a hardware platform 1605, such as an x86 architecture platform. The hardware platform 1605 may include a processor 1602, memory 1604, network communication interface 1612, user interface device 1610, and other input/output (I/O) devices, such as a presentation device 1606. A virtualization software layer is installed on top of the hardware platform 1605.

The virtualization software layer supports a VM execution space 1630 within which multiple VMs (VMs 1635$_1$-1635$_N$) may be concurrently instantiated and executed. Hypervisor 1610 includes a device driver layer 1615, and maps physical resources of the hardware platform 1605 (e.g., processor 1602, memory 1604, network communication interface 1612, and/or user interface device 1610) to "virtual" resources of each of the VMs 1635$_1$-1635$_N$ such that each of the VMs 1635$_1$-1635$_N$ has its own virtual hardware platform (e.g., a corresponding one of virtual hardware platforms 1640$_1$-1640$_N$), each virtual hardware platform having its own emulated hardware (such as a processor 1645, a memory 1650, a network communication interface 1655, a user interface device 1660 and other emulated I/O devices in VM 1635$_1$).

Hypervisor 1610 may manage (e.g., monitor, initiate, and/or terminate) execution of VMs 1635$_1$-1635$_N$ according to policies associated with hypervisor 1610, such as a policy specifying that VMs 1635$_1$-1635$_N$ are to be automatically respawned upon unexpected termination and/or upon initialization of hypervisor 1610. In addition, or alternatively, the hypervisor 1610 may manage execution VMs 1635$_1$-1635$_N$ based on requests received from a device other than host computing device 1601. For example, the hypervisor 1610 may receive an execution instruction specifying the initiation of execution of first VM 1635$_1$ from a management device via the network communication interface 1612 and execute the execution instruction to initiate execution of first VM 1635$_1$.

In some examples, the memory 1650 in the first virtual hardware platform 1640$_1$ includes a virtual disk that is associated with or "mapped to" one or more virtual disk images stored on a disk (e.g., a hard disk or solid state disk) of the host computing device 1600. The virtual disk image represents a file system (e.g., a hierarchy of directories and files) used by the first VM 1635$_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 1615 includes, for example, a communication interface driver 1620 that interacts with the network communication interface 1612 to receive and transmit data from, for example, a LAN connected to the host computing device 1600. The communication interface driver 1620 also includes a virtual bridge 1625 that simulates the broadcasting of data packets in a physical network received from one communication interface (e.g., network communication interface 1612) to other communication interfaces (e.g., the virtual communication interfaces of VMs $1635_1$-$1635_N$). Each virtual communication interface for each VM $1635_1$-$1635_N$, such as the network communication interface 1655 for the first VM $1635_1$, may be assigned a unique virtual MAC address that enables virtual bridge 1625 to simulate the forwarding of incoming data packets from the network communication interface 1612. In an example, the network communication interface 1612 is an Ethernet adapter that is configured in "promiscuous mode" such that all Ethernet packets that it receives (rather than just Ethernet packets addressed to its own physical MAC address) are passed to virtual bridge 1625, which, in turn, is able to further forward the Ethernet packets to VMs $1635_1$-$1635_N$. This configuration enables an Ethernet packet that has a virtual MAC address as its destination address to properly reach the VM in the host computing device 1600 with a virtual communication interface that corresponds to such virtual MAC address.

The virtual hardware platform $1640_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1665 in order to execute applications 1670 for an instantiated VM, such as the first VM $1635_1$. The virtual hardware platforms $1640_1$-$1640_N$ may be considered to be part of the VM monitors (VMM) $1675_1$-$1675_N$ that implement virtual system support to coordinate operations between the hypervisor 1610 and corresponding VMs $1635_1$-$1635_N$. Those with ordinary skill in the art will recognize that the various terms, layers, and categorizations used to describe the virtualization components in FIG. 16 may be referred to differently without departing from their functionality or the spirit or scope of the disclosure. For example, the virtual hardware platforms $1640_1$-$1640_N$ may also be considered to be separate from VMs $1675_1$-$1675_N$, and VMMs $1675_1$-$1675_N$ may be considered to be separate from hypervisor 1610. One example of the hypervisor 1610 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples. each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices, network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for a cluster level resource scheduler for VCIs. For example, the elements illustrated in FIG. 1, FIG. 2, FIG. 3, FIG. 4, FIG. 5, and FIG. 6 such as when encoded to perform the operations illustrated in FIG. 7, FIG. 8 and FIG. 9 constitute exemplary means for selecting a candidate set of hosts from the plurality of hosts in a cluster based on processor and memory utilization; generating a network utilization ranking for each host in the candidate set of hosts based on network utilization associated with each host in the candidate set of hosts; selecting a host from the candidate set of hosts based on the generated network utilization rankings; and placing a powering on VCI on the selected host.

The examples illustrated and described herein as well as examples not specifically described herein but within the scope of aspects of the disclosure also constitute exemplary means for a cluster level resource scheduler for VCIs. For example, the elements illustrated in FIG. 1, FIG. 2, FIG. 3, FIG. 4, FIG. 5, and FIG. 6, such as when encoded to perform the operations illustrated in FIG. 7, FIG. 8, and FIG. 9 constitute exemplary means for ranking each host in a candidate set of hosts based on network utilization and selecting a host for placement of a powering-on VCI based on the ranking, the powering-on VCI is placed on the selected host to minimize network saturation of hosts; generating a score for at least one proposed migration in a set of proposed migrations based on network utilization associated with at least one destination host in the set of proposed migrations; and rejecting a given proposed migration in the set of proposed migrations in response to a determination that a given score associated with the given proposed migration indicates a destination host associated with the proposed migration is network saturated.

The examples illustrated and described herein as well as examples not specifically described herein but within the scope of aspects of the disclosure also constitute exemplary means for a cluster level resource scheduler for VCIs. For example, the elements illustrated in FIG. 1, FIG. 2, FIG. 3, FIG. 4, FIG. 5, and FIG. 6, such as when encoded to perform the operations illustrated in FIG. 7, FIG. 8, and FIG. 9 constitute exemplary means for generating a set of network utilization scores for each destination host in a set of proposed migrations based on a current cluster status snapshot; comparing the generated scores to select a proposed migration from the set of proposed migrations based on the generated scores, the selected proposed migration is associated with a destination host that is network unsaturated or the destination host is less network saturated than other destination hosts in the set of proposed migrations (or, in some examples, not network saturated); and performing the selected proposed migration to move a VCI from a first host in the cluster to a second host in the cluster.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for resource scheduling, the method comprising:
    selecting, for placement of a powering-on virtual computing instance (VCI), a candidate set of hosts from a plurality of hosts in a cluster based on processor utilization and memory utilization;
    receiving runtime statistics associated with the plurality of hosts within the cluster, the runtime statistics comprising network utilization associated with each host in the candidate set of hosts, wherein the network utilization comprises internal networking statistics associated with network traffic between at least two virtual computing instances (VCIs) on a same host;
    generating a network utilization ranking for each host in the candidate set of hosts based on the network utilization;
    selecting a host from the candidate set of hosts based on the generated network utilization rankings; and
    placing the powering-on VCI on the selected host.

2. The method of claim 1, further comprising:
    generating a current cluster status snapshot based on the received runtime statistics; and
    generating the network utilization ranking for each host based on network utilization data from the generated current cluster status snapshot.

3. The method of claim 2, further comprising:
    on determining a predetermined time interval has elapsed, identifying a proposed migration of a particular VCI from a first host in the cluster to a second host in the cluster;
    evaluating the proposed migration based on the current cluster status snapshot;
    on determining the second host is network saturated, rejecting the proposed migration; and on determining the second host is network unsaturated, allowing the proposed migration.

4. The method of claim 1, further comprising:
generating a primary ranking for each host in the plurality of hosts in the cluster, the primary ranking based on processor resources and memory resources associated with each host;
selecting two or more hosts from the plurality of hosts based on the primary ranking, the candidate set of hosts comprising the selected two or more hosts;
generating a secondary ranking for each host in the candidate set of hosts based on processor resources, memory resources, and networking resources; and
selecting the host for placement of the VCI based on the secondary ranking.

5. The method of claim 1, further comprising:
receiving a set of proposed migrations;
generating a network utilization score for each proposed migration in the set of proposed migrations;
comparing each generated network utilization score for each proposed migration to a threshold; and
filtering out each proposed migration associated with a network utilization score exceeding the threshold, wherein the filtered proposed migrations are not performed.

6. The method of claim 1, further comprising:
receiving a set of proposed migrations;
generating a network utilization score for each proposed migration in the set of proposed migrations;
comparing the generated network utilization scores; and
selecting a proposed migration associated with a network utilization score indicating a destination host for the migrating VCI is currently network unsaturated and capable of hosting the VCI without becoming network saturated as a result of the proposed migration.

7. The method of claim 1, further comprising:
comparing the network utilization rankings for each host to a threshold value to identify hosts having a network utilization that exceeds the threshold value; and
in response to identifying a host in the candidate set of hosts having a network utilization that exceeds the threshold value, removing the identified host from the candidate set of hosts.

8. A system for resource scheduling based on network utilization, said system comprising:
at least one memory associated with a set of servers in a cluster, the at least one memory storing a network-utilization based scheduler;
a set of virtual computing instances (VCIs) on the set of servers; and
at least one processor programmed to execute the network-utilization based scheduler to:
receive runtime statistics associated with the set of servers within the cluster, the runtime statistics comprising network utilization associated with each server in the set of servers, wherein the network utilization comprises internal networking statistics associated with network traffic between at least two virtual computing instances (VCIs) on a same server;
generate a set of network utilization scores for each destination host identified in a set of proposed migrations based on a current cluster status snapshot, the current cluster snapshot based at least in part on the runtime statistics;
compare scores in the generated set of network utilization scores to select a proposed migration from the set of proposed migrations, the selected proposed migration identifying a destination host that is less network saturated than other destination hosts identified in the set of proposed migrations; and
perform the selected proposed migration to move at least one of the VCIs from a first server in the set of servers to a second server in the set of servers.

9. The system of claim 8, further comprising:
a filter component, wherein the at least one processor further executes the filter component to compare a first score in the generated scores to a second score in the generated scores to identify a highest score; and
select a proposed migration associated with the highest score.

10. The system of claim 8, further comprising:
a filter component, wherein the at least one processor further executes the filter component to compare a first score in the generated scores to a threshold score; and
in response to the first score exceeding the threshold score, removing a proposed migration associated with the first score from the set of proposed migrations.

11. The system of claim 10, further comprising selecting another proposed migration.

12. The system of claim 8, further comprising:
on determining a destination host associated with a given proposed migration is network saturated and the VCI has a network load, removing the given proposed migration from the set of proposed migrations; and
on determining a destination host associated with a given proposed migration is network saturated and the VCI to be migrated does not have a network load, approving the proposed migration.

13. The system of claim 8, further comprising:
a set of network utilization counters for collecting the internal networking statistics.

14. The system of claim 8, wherein the at least one processor is further programmed to execute the network-utilization based scheduler to select the proposed migration from the set of proposed migrations by selecting a host by:
generating a primary ranking for each host in a plurality of hosts based on a set of primary resources;
selecting a candidate set of hosts from the plurality of hosts based on the primary ranking for each host;
generating a secondary ranking for each host in the candidate set of hosts based on network utilization and network availability of each host;
selecting a host having a highest secondary ranking; and
placing the at least one of the VCIs on the selected host.

15. One or more computer storage media embodying computer-executable components, said components comprising:
an initial placement component that is executed to cause at least one processor to rank each host in a candidate set of hosts based on network utilization and selecting a host for placement of a powering-on virtual computing instance (VCI) based on the ranking, the powering-on VCI being placed on the selected host to minimize network saturation of hosts;
a scheduler that is executed to cause the at least one processor to receive runtime statistics associated with the candidate set of hosts, the runtime statistics comprising network utilization associated with each host in the candidate set of hosts, wherein the network utilization comprises internal networking statistics associated with network traffic between at least two virtual computing instances (VCIs) on a same host;
a load balancing component that is executed to cause the at least one processor to generate a score for at least one proposed migration in a set of proposed migrations for the powering-on VCI based on network utilization associated with at least one destination host in the set of proposed migrations; and a filter component that is executed to cause the at least one processor to reject a given proposed migration in the set of proposed migrations in response to a determination that a given score associated with the given proposed migration indicates a destination host associated with the proposed migration is network saturated.

16. The computer storage media of claim 15, wherein the scheduler, upon execution, further causes the at least one processor to:

generate a primary ranking for each host in a plurality of hosts in the cluster in response to identifying the powering-on VCI for initial placement, the primary ranking based on host utilization of at least one primary resource;

select the candidate set of hosts from the plurality of hosts based on the generated primary rankings;

generate a secondary ranking of each host in the selected candidate set of hosts based on network utilization; and place the powering-on VCI on a host selected from the selected candidate set of hosts based on the generated secondary ranking.

17. The computer storage media of claim 16, wherein the at least one primary resource comprises processor resources and memory resources associated with each of the candidate set of hosts, and wherein the secondary ranking is generated based on processor resources, memory resources, and networking resources associated with the candidate set of hosts.

18. The computer storage media of claim 15, wherein the scheduler, upon further execution, causes the at least one processor to:

generate a current cluster status snapshot based on the runtime statistics; and generate the primary ranking and the secondary ranking for each host based on the current cluster status snapshot.

19. The computer storage media of claim 15, wherein the filter component, when further executed, causes the at least one processor to:

in response to the determination that the given score associated with the given proposed migration indicates the destination host associated with the proposed migration is network saturated, reject the given proposed migration.

20. The computer storage media of claim 15, wherein the filter component, when further executed, causes the at least one processor to:

compare a first score for a first proposed migration to a second score for a second proposed migration; and remove the first proposed migration from the set of proposed migrations in response to the first score exceeding the second score.

* * * * *